Dec. 27, 1966  B. NADEN ETAL  3,294,263
CONVERTIBLE VEHICLE FLOOR ARRANGEMENT
Filed March 31, 1965  2 Sheets-Sheet 1
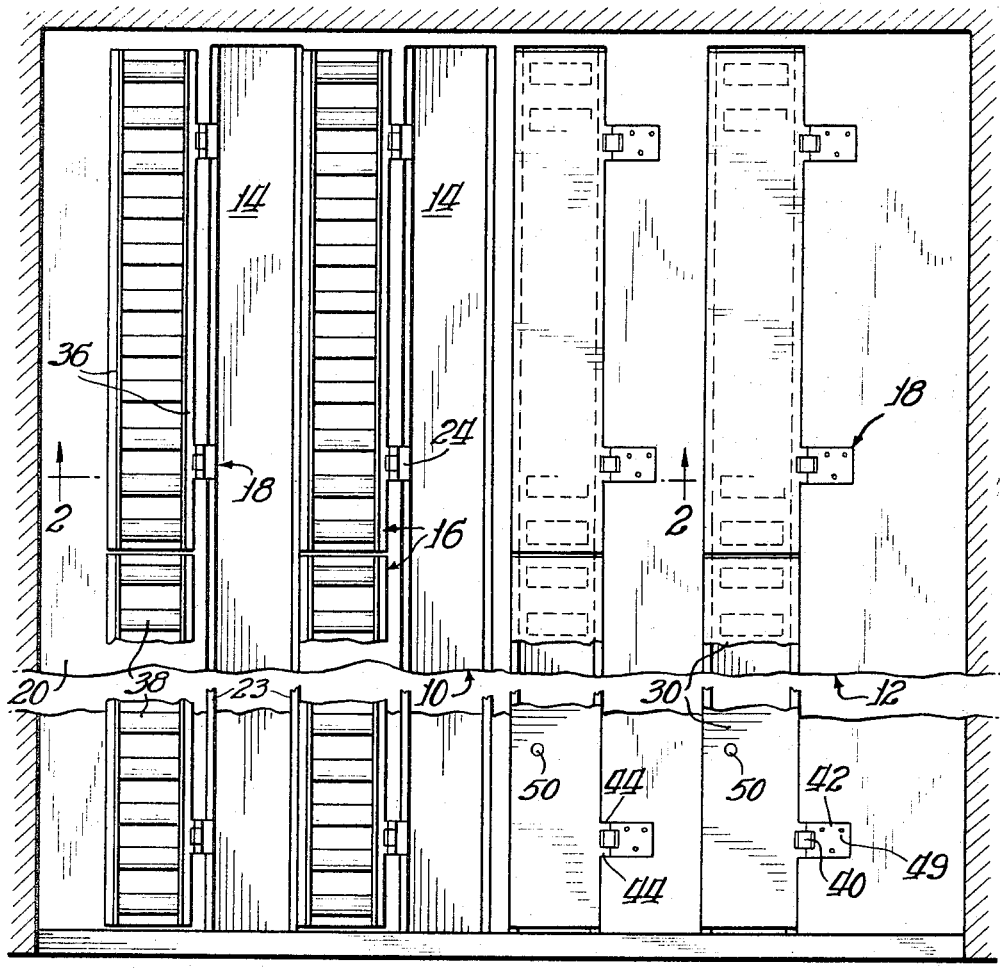
Inventors:
Barney Naden
Jack Trotman
and Isadore Benson
By: Richard W Carpenter Atty.

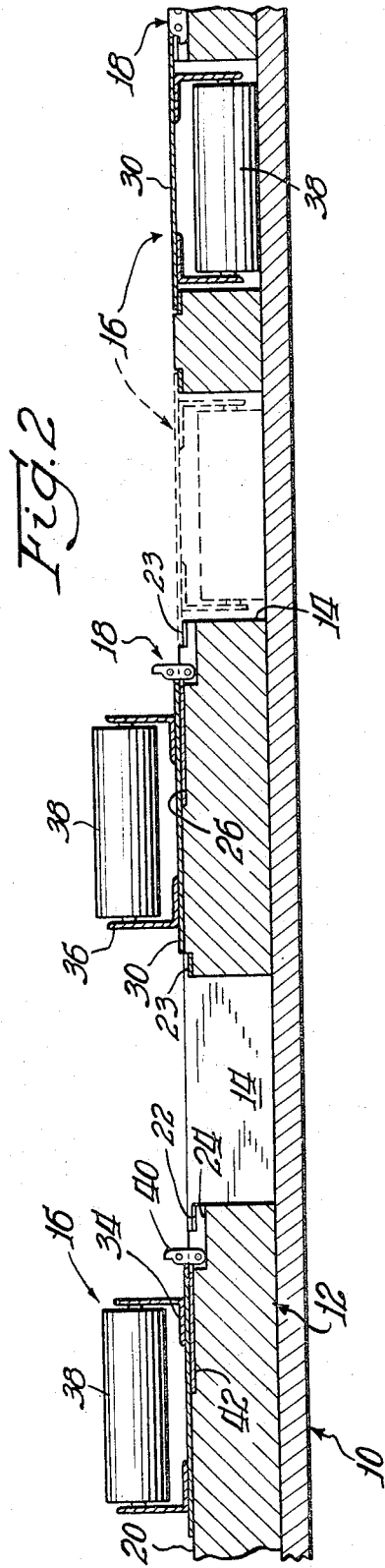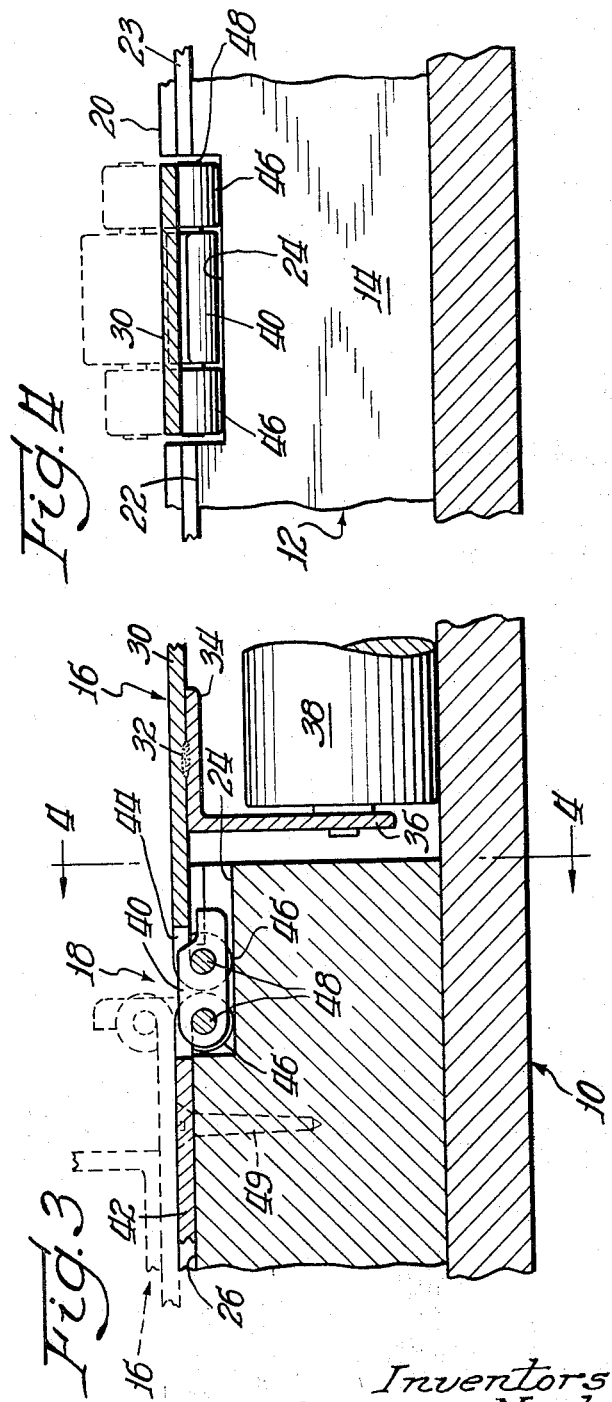
Inventors:
Barney Naden
Jack Trotman
and Isadore Benson

United States Patent Office 3,294,263
Patented Dec. 27, 1966

3,294,263
CONVERTIBLE VEHICLE FLOOR ARRANGEMENT
Barney Naden, Elkins Park, Jack Trotman, Clifton Heights, and Isadore Benson, Philadelphia, Pa., assignors to Container Corporation of America, Chicago, Ill., a corporation of Delaware
Filed Mar. 31, 1965, Ser. No. 444,327
4 Claims. (Cl. 214—84)

This invention relates to floor arrangements and more particularly to an improved floor arrangement for a cargo transporting vehicle such as a truck, semi-trailer, or railway car.

The invention comprehends an improved arrangement for the floor or deck of a cargo vehicle which is readily convertible from a flat deck to a conveyor in order to facilitate loading or unloading of the vehicle.

Although the concept of providing a cargo vehicle with a convertible floor arrangement is not new per se to the art of material handling, many of the arrangements disclosed in the prior art and now in current use involve cumbersome or complex mechanisms which are either too expensive to produce or which are too difficult or awkward permit their operation under certain conditions by a single person.

It is therefore an object of this invention to provide a simple floor arrangement which can be manually operated by one person to convert all or a portion of the floor of a cargo vehicle from a plain flat deck to a roller conveyor.

A more specific object of the invention is to provide, in an arrangement of the type described, a series of elongated deck sections separated by wells within which are positioned movable conveyor sections each of which include a flat plate on one side and a roller conveyor on the other side and which are hinged to adjacent deck sections for movement between inoperative positions within the wells and operative positions in back-to-back relationship with the deck sections.

These and other objects of the invention will be apparent from an examination of the following description and drawings wherein:

FIGURE 1 is a top plan view of a vehicle floor arrangement embodying features of the invention, with the conveyor sections at the left side of the drawing being shown in open or operative position and those at the right side being shown in closed or inoperative position;

FIGURE 2 is a fragmentary transverse vertical section taken on line 2—2 of FIGURE 1;

FIGURE 3 is an enlarged view of a portion of the structure illustrated in FIGURE 2, with the conveyor section being shown in closed position in solid lines and in open position an phantom lines; and FIGURE 4 is a fragmentary longitudinal vertical section taken on line 4—4 of FIGURE 3.

It will be understood that, for purposes of clarity, certain elements have been intentionally omitted from certain views where they are believed to be illustrated to better advantage in other views.

Referring now to the drawings for a better understanding of the invention, and particularly to FIGURE 2, it will be seen that the vehicle is provided with a generally flat, horizontally disposed vehicle bed or sub-floor 10 on which are rigidly mounted a plurality of deck sections indicated generally at 12.

The deck sections 12 are preferably disposed to extend longitudinally of the vehicle in parallel relationship with each other and are spaced transversely of the vehicle from each other uniform distances to provide, between each pair of adjacent deck sections, a longitudinally extending channel or well 14.

Disposed within each of the wells 14 are a plurality of aligned, longitudinally extending, movable conveyor sections arranged in end-to-end relationship to form a continuous conveyor when all of the sections in one well are placed in the operative position, but which may be operated independently of each other if it is only desired to utilize a portion of the cargo vehicle deck as a conveyor. The conveyor sections are disposed within the wells when in inoperative position and are hingedly attached by recessed hinge means, indicated generally at 18, to the adjacent deck sections 12 for movement out of the wells and onto the adjacent deck section when the conveyor sections are in operative position.

Still referring to FIGURE 2, it will be seen that the deck sections present generally flat, upwardly facing surfaces 20 which are disposed in a common plane, hereinafter referred to he plane of the deck surfaces. Still referring to FIGURE 2, and particularly to the deck section illustrated in the center of FIGURE 2, it will be seen that the deck sections is recessed along each side thereof to provide a relatively narrow ledge 22 extending longitudinally of the deck section and spaced a short distance downwardly from the deck surface 20. The purpose of the ledge 22 is to support the marginal portions of conveyor section plates 30 in a manner hereinafter described. Additionally, at one side of each deck section 20 there are provided at spaced intervals additional pairs of deep and shallow recesses which provide shelves 24 and 26, respectively, which are adapted to support portions of the hinge mechanism in a manner hereinafter described.

As best seen in FIGURE 3, each of the conveyor sections includes a longitudinally extending, generally rectangular, relatively thin, flat plate 30 which has welded to the underside thereof at 32 along each side thereof a pair of angle irons 34 having downwardly projecting longitudinally extending vertical side members 36 within which are journaled a plurality of rollers 38 spaced longitudinally of the conveyor section from each other and extending transversely of the conveyor section in parallel relationship.

The hinge mechanism, indicated generally at 18, are best seen from examination of FIGURE 3. It will be noted that each of the hinges includes a main portion or body 40 supported on shelf 24 of the deck section and having pivotally secured to opposite sides thereof a securing plate 42, supported on shelf 26 of the deck section and a conveyor plate extension 44. Plates 42 and 44 both present at their adjacent ends barrels 46 which have interlocking engagement with opposite sides of hinge body 40 and which are pivotally connected thereto by hinge pins 48. Securing plates 42 may be permanently attached to the deck sections by means of countersunk screws 49.

It will be seen that the conveyor plate extensions 44 are secured to or preferably formed integrally with the main conveyor plates 30, so that the conveyor plates 30 are, in effect, actually pivotally connected to the adjacent deck section by double hinge 18 which permits them to be folded or rotated 180° so as to lie in back-to-back relation with the upper surface of the adjacent deck section when the conveyor is in operative position.

Thus in operation, it will be seen that when it is desired to have a completely flat floor or deck for the cargo vehicle all of the conveyor sections are positioned in their inoperative position in their respective wells, so that the upper surface of their conveyor plates 30 are disposed in a common plane which is the same as the plane of the deck surfaces. In order to convert all or a portion of the vehicle floor from a flat deck to a conveyor, as many of the sections as are required are lifted by means of the finger holes 50 in the conveyor section plates 30 and folded over 180° to their operative positions in back-to-back relation with the adjacent deck sections. To return the vehicle floor to its original condition the conveyor sections are merely rotated back into inoperative position within the wells.

If desired, ledges 22 may be covered by relatively thin steel plates 23 to prevent undue wear of the ledges.

It will be noted that by providing within each well a plurality of conveyor sections it is possible to convert either one end, one side, or any other desired portion of the vehicle floor to a conveyor section while the remaining areas of the vehicle floor remain as a flat deck surface.

We claim:
1. A cargo vehicle floor arrangement having deck sections which are fixed and conveyor sections which are movable between operative and inoperative positions for converting said floor arrangement from a flat deck to a conveyor, comprising in combination;
  (a) a horizontal supporting bed;
  (b) a plurality of elongated deck sections rigidly mounted on said bed to extend longitudinally of the vehicle in parallel relation with each other and being spaced transversely of the vehicle from each other to define between each pair of adjacent sections a substantially coextensive elongated well;
  (c) said deck sections presenting flat upper surfaces disposed in a common plane;
  (d) said deck sections being recessed at their side corners to provide adjacent said well narrow, elongated ledges spaced downwardly from said deck section surfaces;
  (e) a plurality of independent, longitudinally extending movable conveyor sections disposed in each of said wells in end-to-end relation and mounted for pivotal movement out of said wells and onto adjacent deck sections;
  (f) each of said conveyor section including:
    (i) a relatively thin, flat, elongated plate positioned over a well with its marginal edges supported by the ledges of adjacent deck sections, and presenting a flat, horizontal, upwardly facing, outer surface on one side thereof which is disposed in the plane of said deck section surfaces when the conveyor section is in the inoperative position;
    (ii) a plurality of transversely extending longitudinally spaced rollers rotatably mounted on the underside of said plate and positioned within the well when the conveyor section is in the inoperative position, and arranged to form an upwardly facing roller conveyor track when said conveyor section is in the operative position;
    (iii) hinge means disposed entirely below the plane of said deck section surfaces pivotably connecting said plate to one of said adjacent deck sections operative to permit the rotation of the former 180° into back-to-back relation with the latter to convert the conveyor from the inoperative to the operative position.

2. A cargo vehicle floor arrangement having deck sections which are fixed and conveyor sections which are movable between operative and inoperative positions for converting said floor arrangement from a flat deck to a conveyor, comprising in combination;
  (a) a horizontal supporting bed;
  (b) a pair of elongated deck sections rigidly mounted on said bed to extend longitudinally of the vehicle in parallel relation with each other and being spaced transversely of the vehicle from each other to define therebetween an elongated well;
  (c) said deck sections presenting flat upper surfaces disposed in a common plane;
  (d) said deck sections being recessed at their side corners to provide adjacent said well ledges spaced downwardly from said deck section surfaces;
  (e) a longitudinally extending movable conveyor section disposed in said well and mounted for pivotal movement out of said well and onto an adjacent deck section;
  (f) said conveyor section including:
    (i) an elongated plate positioned over said well with its marginal edges supported by the ledges of adjacent deck sections, and presenting a flat, horizontal, upwardly facing, outer surface on one side thereof which is disposed in the plane of said deck section surfaces when the conveyor section is in the inoperative position;
    (ii) a plurality of transversely extending longitudinally spaced rollers rotatably mounted on the underside of said plate and positioned within the well when the conveyor section is in the inoperative position, and arranged to form an upwardly facing roller conveyor track when said conveyor section is in the operative position;
    (iii) hinge means disposed entirely below the plane of said deck section surfaces pivotably connecting said plate to one of said adjacent deck sections operative to permit the rotation of the former 180° into back-to-back relation with the latter to convert the conveyor from the inoperative to the operative position.

3. A cargo vehicle floor arrangement having deck sections which are fixed and conveyor sections which are movable between operative and inoperative positions for converting said floor arrangement from a flat deck to a conveyor, comprising in combination;
  (a) a pair of elongated deck sections extending longitudinally of the vehicle in parallel relation with each other and spaced transversely of the vehicle from each other to define therebetween an elongated well;
  (b) said deck sections presenting flat upper surfaces disposed in a common plane;
  (c) said deck sections being recessed at their side corners to provide, adjacent said well, ledges spaced downwardly from said deck section surfaces;
  (d) a longitudinally extending movable conveyor section disposed in said well and mounted for pivotal movement out of said well and onto an adjacent deck section;
  (e) said conveyor section including:
    (i) an elongated plate positioned over said well with its marginal edges supported by the ledges of adjacent deck sections, and presenting a flat, horizontal, upwarly facing, outer surface on one side thereof which is disposed in the plane of said deck section surfaces when the conveyor section is in the inoperative position;
    (ii) a plurality of transversely extending longitudinally spaced rollers rotatably mounted on the underside of said plate and positioned within the well when the conveyor section is in the inoperative position, and arranged to form an upwardly facing roller conveyor track when said conveyor section is in the operative position;
    (iii) hinge means disposed entirely below the plane of said deck section surfaces pivotably connecting said plate to one of said adjacent deck sections operative to permit the rotation of the former 180° into back-to-back relation with the latter to convert the conveyor from the inoperative to the operative position.

4. A cargo vehicle floor arrangement having deck sections which are fixed and conveyor sections which are movable between operative and inoperative positions for converting said floor arrangement from a flat deck to a conveyor, comprising in combination;
  (a) a pair of elongated deck sections disposed in parallel relation with each other and spaced from each other to define therebetwen an elongated well;

(b) said deck sections presenting flat upper surfaces disposed in a common plane;
(c) a movable conveyor section disposed in said well and mounted for pivotal movement out of said well and onto an adjacent deck section;
(d) said conveyor section including:
  (i) an elongated plate positioned over said well and presenting a flat, horizontal, upwardly facing, outer surface on one side thereof which is disposed in the plane of said deck section surfaces when the conveyor section is in the inoperative position;
  (ii) a plurality of spaced rollers rotatably mounted on the underside of said plate and positioned within the well when the conveyor section is in the inoperative position, and arranged to form an upwardly facing roller conveyor when said conveyor section is in the operation position;
  (iii) hinge means disposed entirely below the plane of said deck section surfaces pivotably connecting said plate to one of said adjacent deck sections operative to permit the rotation of the former 180° into back-to-back relation with the latter to convert the conveyor from the inoperative to the operative position.

References Cited by the Examiner
UNITED STATES PATENTS

| | | | |
|---|---|---|---|
| 2,347,002 | 4/1944 | Schofield | 214—84 X |
| 2,693,286 | 11/1954 | Cocks | 214—84 |

GERALD M. FORLENZA, *Primary Examiner.*
A. J. MAKAY, *Assistant Examiner.*